United States Patent Office 3,420,092
Patented Jan. 7, 1969

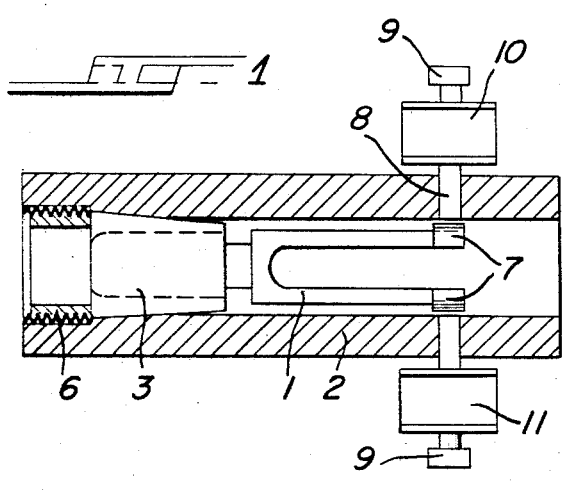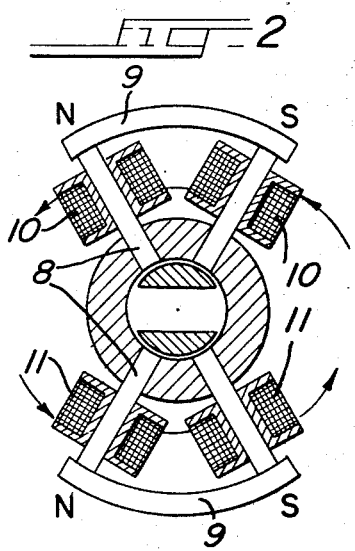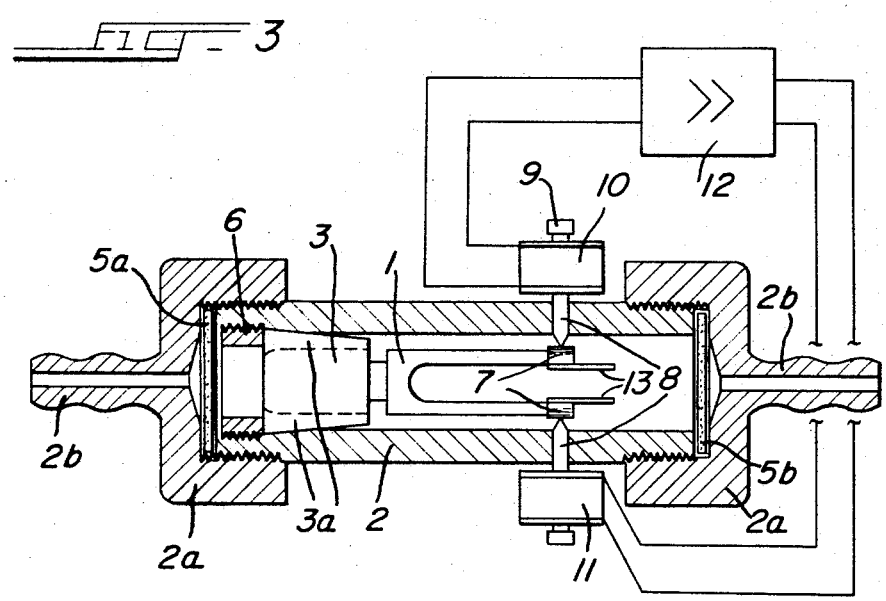

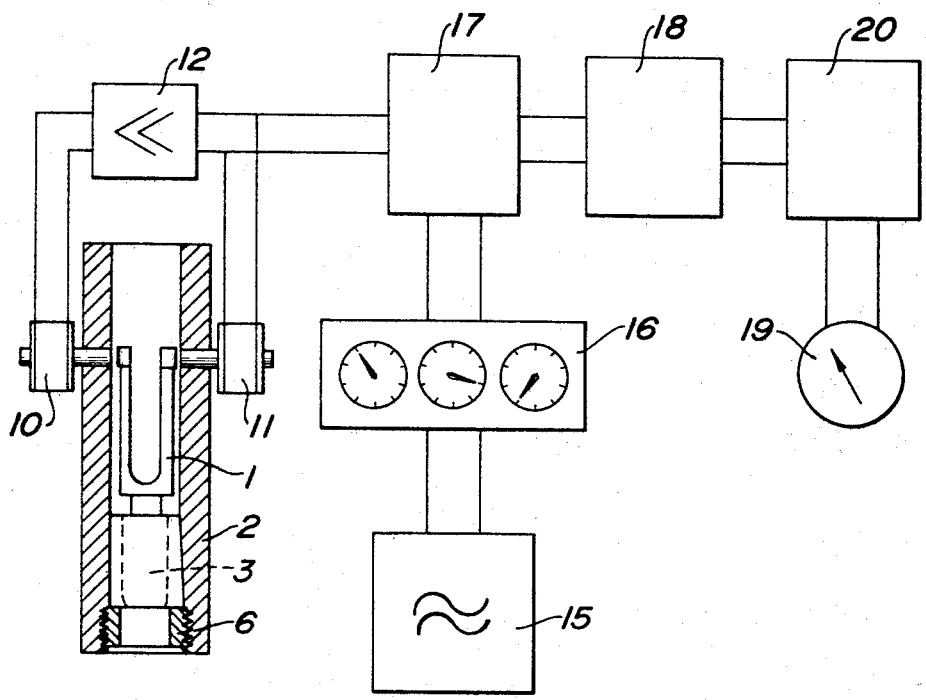
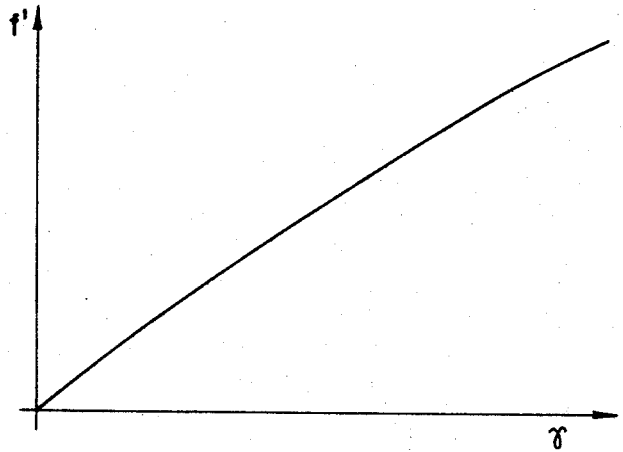
INVENTOR.
DIETER DORSCH

3,420,092
MEASURING THE SPECIFIC GRAVITY OF GASES AND LIQUIDS AND APPARATUS THEREFOR
Dieter Dorsch, Ludwigshafen (Rhine), Germany, assignor to Badische Anilin- & Soda-Fabrik Aktiengesellschaft, Ludwigshafen (Rhine), Germany
Filed Feb. 21, 1966, Ser. No. 528,947
Claims priority, application Germany, Dec. 21, 1965, B 85,069
U.S. Cl. 73—32                                    3 Claims
Int. Cl. G01n 9/00

ABSTRACT OF THE DISCLOSURE

Apparatus for continuously measuring the specific gravity, density or pressure of gases or liquid in a tube which contains a tuning fork capable of being excited electrically from outside to mechanical vibration with its natural frequency. The changes in natural frequency due to changes in these properties of the gases or liquids are measured by means of an electric frequency measuring system.

---

Figure 4:
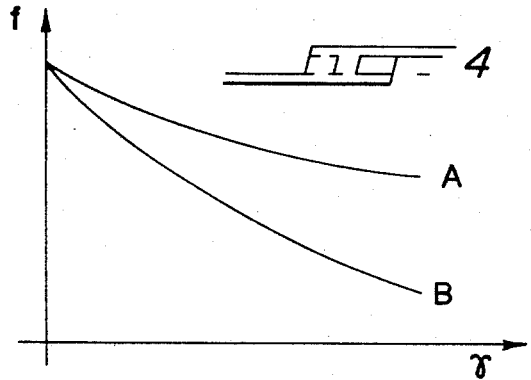

This invention relates to a method of continuously measuring the specific gravity or density of liquids and gases in closed systems and under high pressure, as well as to apparatus and circuits for performing the method.

For determining rates fo fluid flow a knowledge of the specific gravity or density of the fluid is of great practical importance. The usual methods of measuring flow rates merely give the volumetric rate, whereas for production control flow rate of the gas by reference to weight which is unaffected by pressure and temperature must be known.

In production plant measurements for the determination of the specific gravity or density of fluids have in the past generally been performed by graphically or digitally integrating the measured fluid volume of gas that passes through a voulmetric measuring device within a given period of time. From the parameters which characterize the state of the fluid, such as pressure and temperature, and which are recorded at the same time, and from the physical constants of the fluid, its mean specific gravity or density is computed and the weight of the fluid that has passed through the measuring device during the said period of time is calculated from the result of the computation. Owing to the multiplicity of operations this method involves, its results are necessarily not very accurate. A considerable number of measuring instruments and a considerable amount of evaluating computation are needed, particularly if the physical parameters that enter into the calculation fluctuate widely. Apart from these methods weighing procedures which can be continuously performed are likewise known, particularly for the determination of the specific gravity of a liquid. Apparatus used for such purposes are not very accurate because of the flexible pipes which must be attached to the sampling vessel and which must also be weighed, and for measuring liquids which are at high pressures they cannot be used at all.

It has also been proposed electromagnetically to excite the completely filled sampling vessel, including all the pipe means attached thereto, to vibrate and to measure the frequency changes of the vibrating vessel and of its contents when the specific gravity or density of the latter undergoes change. In this known arrangement the sampling vessel itself and its connections are included in the vibrating system and the natural frequency of such a system cannot be kept sufficiently constant. Moreover, for measuring the specific gravity of a liquid the sampling vessel must always be completely filled with the liquid, i.e., the liquid must not contain bubbles. In the case of liquids containing gases in solution, or of liquids which are near their boiling points, this essential requirement for avoiding errors in measurement is difficult to fulfil.

It is the object of the present invention to provide a method of continuously measuring the specific gravity or density of any liquids and gases which avoids the difficulties arising in the above described methods of measurement and which permits measurements to be made when such fluids are under high pressure and at high temperature. The new method yields the required specific gravity or density of the fluid directly, i.e., without a simultaneous or additional measurement of the pressure and temperature being required.

The method according to the present invention consists in continuously contacting the fluid that is to be subjected to measurement with a system vibrating at a predetermined frequency inside a cavity bounded by walls which do not participate in the vibration and in continuously measuring the frequency which changes in functional dependence upon the specific gravity or density of the fluid.

Apparatus for performing the method according to the invention comprises a fork-shaped vibrating member which is mounted inside a thick-walled tube made of a material of low magnetic permeability provided with a plurality of pole shoes of ferromagnetic material projecting through the tube wall to the outside in a cross sectional plane containing the ends of the freely vibrating fork and connected in pairs to a permanent magnet, each pole shoe being embraced by a coil.

According to another feature of the invention the vibrating system which resembles a tuning fork is provided with a non-vibrating stem and one or more non-vibrating tubes are preferably rigidly screwed to this stem. The non-vibrating tube which contains the tuning fork will be hereinafter referred to as the measuring cell.

According to yet another feature of the invention the vibrating ends of the tuning fork are provided with flat or round baffle plates for increasing the effect of the forces that act on the vibrating ends.

The natural frequency of this vibrating system has been found to depend exclusively upon the specific gravity or density of the fluid in which the fork is immersed, and the nature of the fluid and more particularly the considerably varying viscosities of different gases and liquids do not affect the result of the measurement. This property of apparatus for performing the method is of particular utility for measuring gases, because it is possible to calibrate the apparatus and the associated electronic equipment by reference to a particular gas A of known density for a given density range and then to use it for a direct density measurement of some other gas B or gas mixture C of unknown composition.

Figure 5A:
Figure 5B:
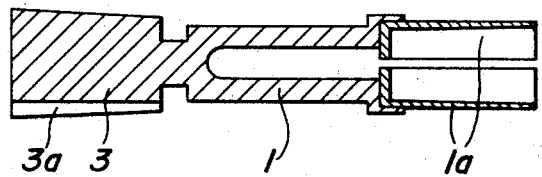

Several embodiments of the new measuring apparatus and of the associated electronic measuring equipment are shown by way of example in the accompanying drawings in which FIG. 1 is an axial section of the tube which forms the measuring cell and of the tuning fork which is located therein, FIG. 2 is a cross section of the measuring cell taken in the plane of the ends of the tuning fork blades, FIG. 3 is an alternative embodiment of the measuring cell which is intended particularly for measuring liquids, FIG. 4 illustrates the functional relationship between the frequency of vibration $f$ and the specific gravity or density $\gamma$ of a fluid in the case of tuning forks with and without baffle plates at the ends of their blades, FIGS. 5a and 5b are a cross section and side view respectively of an embodiment of blade ends with split hollow cylindrical baffle plates, FIG. 6 is an embodiment of a circuit for the electrical equipment required for measuring and recording the measured results, FIG. 7 shows the specific gravity or density curve $\gamma$ in an expanded frequency range $f'$.

As shown in FIGS. 1 and 2, the measuring cell which in its interior contains the vibrating system substantially comprises a tuning fork 1 which is coaxially disposed inside a pressure tube 2. The fixed end of the tuning fork is provided with a taper shank 3 which is held by a threaded ring 6 in a socket of the same taper as the shank of the fork inside the tube 2 in an exactly defined position. The tuning fork can thus be readily replaced by tuning forks having other natural frequencies. The taper shank 3 is formed with one or more slots 3a (see FIG. 5b) through which the measured fluid can enter.

The vibrating ends of the tuning fork are provided with ferromagnetic heads 7 each facing a pair of ferromagnetic pole shoes 8. The pole shoes 8 are welded into opposite sides of the pressure-tight tube 2. They project from the tube wall and the two outside ends of each pair of pole shoes are connected by a permanent magnet 9. One of the pairs of pole shoes together with coils 10 embracing the pole shoes 8 thus form an inductive pickoff whereas the other forms an electromagnet 11.

The tuning fork 1 is excited to undamped vibrations by the inductive pickoffs 10 and the electromagnets 11, disposed on the periphery of the pressure tube, the changes in strength of the electromagnetic field being transmitted through the tube wall 2, which consists of a brass or a low-permeability steel, to the blade ends 7 of the tuning fork by the ferromagnetic pole shoes 8 which are soldered or welded into the tube wall. Bushings for conducting electrical leads through the walls of the tube 2 are not required. The inductive pickoffs 10 and the electromagnets 11 are connected to the input and output sides respectively of an A.C. voltage amplifier 12 and, provided the gain is sufficient and the mechanical and electrical oscillations are in phase, the entire arrangement comprising the magnetic circuit, the amplifier and the tuning fork will be excited to oscillate in conventional manner (FIGS. 2 and 3). The frequency of the oscillation thus generated will then be determined by the natural frequency $f$ of the tuning fork 1.

FIG. 3 illustrates a modification of the measuring cell shown in FIG. 1, which is adapted more particularly to the measurement of the specific gravity of a liquid. The tube 2 forming the measuring cell is sealed at each end by a screw cap 2a. The screw caps may themselves be provided with connecting members 2b for attachment thereto of flexible tubes. In order to prevent impurities from being carried into the measuring cell, screens or filter plates 5a, 5b may be placed across both ends of the tube where they can be held in position by the screw caps 2a. For further adapting the cell to the measurement of liquids an annular chamber of particularly wide cross section may be provided between the vibrating ends of the tuning fork 1 and the inner surface of the wall of tube 2. This will operate to prevent capillary forces from being generated between the blade ends of the tuning fork and the tube wall. If such capillary forces should arise they would affect the accuracy of the measurement. The cross section of the ends of the tuning fork (blade ends) may be such as to define two sections of a circle of given radius, the chords defining the inside edges of the sections being parallel.

Suitable materials for making the tuning fork 1 are, generally, metal alloys which have an elastic modulus that is not affected by temperature. In particular cases, for instance for measuring highly corrosive fluids, the use of non-metallic materials, such as quartz or ceramic materials, would be appropriate for the tuning fork, provided the ends of the blades of the fork are provided with completely embedded and sealed ferromagnetic heads.

When in such an arrangement the frequency of the tuning fork is measured for instance as a function of the density of a gas in which the tuning fork is immersed, the result is a curve such as that shown at A in FIG. 4. The originally measured frequency $f$ of say 1000 c./s. diminishes with rising density $\gamma$, the rate of decrease likewise diminishing with increasing density. The frequency changes are relatively small when an ordinary tuning fork is employed. For a density change of say 0.05 g./cc. they amount to only about 1% of the fundamental tuning fork frequency. However, the frequency changes can be very accurately determined and are reproducible.

For measuring liquids the effect of viscosity on the amplitude of vibration of the baffle plates must be excluded by providing particularly rigid baffle plates at the ends of the tuning fork blades. The ends of the tuning fork blades in FIGS. 5a and 5b are therefore provided with a short cylindrical bore for the insertion thereinto of a cylindrical sleeve 1a. This sleeve 1a is then split by making a wide axial cut, thereby forming two substantially semicircular cylinder halves which can freely participate in the vibratory motions of the blade ends. The length of the split sleeve 1a may be selectably varied according to the viscosity of the measured fluid.

The sensitivity of the device can be further improved by associating it with an electrical measuring circuit for performing the method, as illustrated in block form in FIG. 6. In this circuit the frequency which appears in the output of the amplifier 12 and which is determined by the frequency of vibration of the tuning fork 1 is beaten with a second frequency which is supplied by a quartz-controlled oscillator 15 and which is suitably demultiplied for instance in a decimal ratio frequency divider 16. A beat frequency $f'$ representing the sum and difference of the two input frequencies is thus obtained in the mixing stage 17. If the variations, due to density changes, of the difference frequency between the two input frequencies (beat frequency) isolated in a low pass filter 18 arranged after the mixing stage 17 are plotted in a graph, the characteristic curve of such an arrangement will be found to have the shape shown in FIG. 7. In the example illustrated in FIG. 7 the reference frequency introduced into the mixer is exactly equal to the frequency $f$ of the tuning fork at the bottom end of its range. The usefulness of the interposition of a pulse frequency divider 16 will be clearly appreciated from FIG. 7. For instance, when the tuning fork is replaced or the measuring range changed, the pulse frequency divider 16 permits a reference frequency to be supplied to the mixing stage 17 which can be very finely and reproducibly adjusted.

For the usual measuring range of a density meter between 0.10 and 0.15 g./cc. the frequency $f'$ at the upper end of the range may be 80 or 100 c./s. This frequency can be easily converted into a D.C. voltage or an impressed direct current that is proportional to the existing frequency with the aid of conventional frequency measuring circuits, such as one based on the rate meter principle. This voltage or current can then be used as a measure of the specific gravity or density ascertained by the apparatus, and indicated or recorded for instance with the aid of a moving coil instrument. The curvature of the characteristic curve still noticeable in FIG. 4 has become insignificant in the curve in FIG. 7 because the latter represents only a relatively small frequency interval, corresponding to the range of density measurements, the interval having been expanded in scale over the entire measuring range. In the practical construction of a density meter based on the above described principle, a linear relationship between density and equivalent output voltage can therefore be assumed with a maximum error of about 0.5%.

The entire measuring system that has been described is substantially unaffected by mains voltage fluctuations and changes in the constants of the amplifying elements and electrical components, such as transistors, resistors and capacitors because only the frequencies delivered by the tuning fork generator 1 and the quartz oscillator 15 govern the magnitude of the beat frequency used for the measurement, and neither the amplitude nor the wave shape of these voltages enter into the picture. In a tuning fork oscillator according to the invention any frequency changes at constant specific gravity due to temperature fluctuations are negligibly small when using a tuning fork of unalloyed steel. However, for further reducing this possible source of error the tuning fork for extreme accuracy of measurement may consist of a steel that has an elastic modulus with a substantially constant temperature coefficient. The electronic quartz oscillator 15 that is employed can be stabilized by an ordinary thermostat if its very slight frequency change at changing temperature should have any noticeable effect. Merely the frequency meter 20 which converts the beat frequency $f'$ into a D.C. voltage requires the supply of a constant operating voltage.

I claim:

1. Apparatus for measuring the specific gravity or density of gases and liquids which comprises: a thick-walled tube made of a material of low magnetic permeability, a tuning fork located coaxially within said tube and capable of being excited to mechanical vibration, a plurality of ferromagnetic pole shoes arranged in diametrically opposed pairs in the cross sectional plane containing the freely vibrating ends of said tuning fork and embraced by induction coils, each of said pairs of adjoining pole shoes being interconnected by means of a permanent magnet to form a magnetic circuit, the two coils of each of said magnetic circuits being connected in series and each of said pairs of series-connected coils being connected to the input and output of an AC voltage amplifier, said amplifier being back-coupled via said tuning fork and capable of oscillating with the natural frequency of said tuning fork, said natural frequency being dependent on the specific weight or density of the gas or liquid, and means for measuring said frequency.

2. Apparatus according to claim 1 wherein the blade ends of the fork carry an axially divided hollow cylindrical member.

3. Apparatus according to claim 1 wherein the fork-shaped member which is excited to mechanical vibration has a taper shank at its root detachably fitted into a socket which does not vibrate.

References Cited

UNITED STATES PATENTS

| 3,145,559 | 8/1964 | Banks | 73—32 |
| 3,018,439 | 1/1962 | Burrow | 73—67.2 |

OTHER REFERENCES

Stott, F. D.: Sonic Gas Analyzer, November 1957, The Review of Scientific Instruments, vol. 28, No. 11.

RICHARD C. QUEISSER, *Primary Examiner.*

J. K. LUNSFORD, *Assistant Examiner.*

U.S. Cl. X.R.

73—24, 30